United States Patent
Vick et al.

(10) Patent No.: US 8,555,013 B1
(45) Date of Patent: Oct. 8, 2013

(54) METHOD AND SYSTEM FOR MEMORY PROTECTION BY PROCESSOR CARRIER BASED ACCESS CONTROL

(75) Inventors: Christopher A. Vick, San Jose, CA (US); Michael H. Paleczny, San Jose, CA (US); Jay R. Freeman, Palo Alto, CA (US); Olaf Manczak, Hayward, CA (US); Phyllis E. Gustafson, Pleasanton, CA (US); Yuguang Wu, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1242 days.

(21) Appl. No.: 11/158,774

(22) Filed: Jun. 22, 2005

(51) Int. Cl.
*G06F 13/00* (2006.01)
*G06F 13/28* (2006.01)

(52) U.S. Cl.
USPC .................. 711/163; 71/154; 71/E21.093

(58) Field of Classification Search
USPC .................................................. 711/202, 163
See application file for complete search history.

(56) References Cited

U.S. PATENT DOCUMENTS

| | | | | |
|---|---|---|---|---|
| 5,606,681 A | * | 2/1997 | Smith et al. | 711/203 |
| 6,647,387 B1 | * | 11/2003 | McKean et al. | 707/9 |
| 6,745,281 B1 | * | 6/2004 | Saegusa | 711/112 |
| 2002/0161474 A1 | * | 10/2002 | Dimitri et al. | 700/214 |
| 2003/0043802 A1 | * | 3/2003 | Yazaki et al. | 370/389 |
| 2003/0069938 A1 | * | 4/2003 | Russell | 709/213 |
| 2003/0161309 A1 | * | 8/2003 | Karuppiah | 370/392 |
| 2004/0054866 A1 | * | 3/2004 | Blumenau et al. | 711/202 |

* cited by examiner

*Primary Examiner* — Reginald Bragdon
*Assistant Examiner* — Eric S Cardwell
(74) *Attorney, Agent, or Firm* — Osha Liang LLP

(57) ABSTRACT

A method for memory protection in a multiprocessor system, involving receiving a request at a first carrier to perform a memory operation at a memory address, wherein the first carrier receives the request from a processor, determining by the first carrier whether the processor is permitted to access memory at the memory address using a carrier identification (ID) of a second carrier, wherein the second carrier is associated with a memory controller used to access the memory, and sending the request to the second carrier, if the processor is permitted to access the memory.

19 Claims, 3 Drawing Sheets

METHOD AND SYSTEM FOR MEMORY PROTECTION BY PROCESSOR CARRIER BASED ACCESS CONTROL

STATEMENT REGARDING FEDERALLY SPONSORED RESEARCH OR DEVELOPMENT

The present invention was made with the support of the government of the United States under contract NBCH020055 awarded by the Defense Advanced Research Projects Administration. The United States government may have certain rights in the present invention.

BACKGROUND

Multiprocessor systems typically include one or more processors and some form of memory (e.g., RAM). Conventionally, in multiprocessor systems, a portion of memory is shared between some or all of the processors in the system (i.e., shared memory). Processes (threads) executing on each processor use shared memory to read and write data during execution. Shared memory is typically divided into regions, and each region is mapped into the physical address space of the processes that are sharing the memory. To prevent multiple processes from accessing the same memory locations and overwriting data, processes are only permitted to access the region of shared memory allocated to each process or to the processor on which the process is executing. To ensure that illegal memory accesses (i.e., memory accesses by processes on a processor to regions that are not allocated for that processor) are not permitted, typically, processors include functionality to perform memory protection functions to check whether each request for access to a particular memory address in shared memory is a legal memory access request.

One method used to control and protect shared memory on multiprocessor systems involves the use of virtual memory management. Virtual memory is a range of addressable locations independent from the size of physical memory. Specifically, virtual memory is a form of memory management in which large programs (i.e., programs that requires more physical memory than is available) are stored after being broken up into separate, independent sections. Typically, one section is "overlaid" on top of another when that particular section is to be executed. Virtual memory is typically implemented using paging. In paging, the low order bits of the binary representation of the "virtual address" (i.e., the address provided by software that does not directly reference physical main memory) are preserved, and used directly as the low order bits of the actual physical address; the high order bits are treated as a key to one or more address translation tables, which provide the high order bits of the actual physical address. Thus, a range of consecutive addresses in the virtual address space whose size is a power of two is translated into a corresponding range of consecutive physical addresses. The memory referenced by such a range is called a page.

When a physical memory location is read or written to by a processor, the virtual address is translated into the actual physical address in which the instructions/data are placed. The process of mapping a virtual address to a physical address is called virtual address translation. The virtual-to-physical mappings are maintained by the operating system and the memory management unit (MMU) of a multiprocessor system. Specifically, the MMU translates virtual-to-physical addresses using a page table, where the page table is a process-specific table that stores the virtual-to-physical address mappings associated with each process. Thus, each virtual memory address requires two physical memory references: one for the page table to obtain the mapping of the virtual memory address, and one to the actual physical memory address.

Because the requirement of two physical memory references is a performance penalty, typically, most multiprocessor systems include a small associative memory, known as a translation look-aside buffer (TLB), which contains the last few virtual addresses and their corresponding physical addresses. The TLB eliminates the need for the page table physical memory reference by caching recent virtual to physical address mappings. Because the TLB is tightly-coupled to the processor, in some cases, protecting shared memory using a TLB becomes difficult with large scale distributed systems that include several processes executing in parallel.

SUMMARY

In general, in one aspect, the invention relates to a method for memory protection in a multiprocessor system, comprising receiving a request at a first carrier to perform a memory operation at a memory address, wherein the first carrier receives the request from a processor, determining by the first carrier whether the processor is permitted to access memory at the memory address using a carrier identification (ID) of a second carrier, wherein the second carrier is associated with a memory controller used to access the memory, and sending the request to the second carrier, if the processor is permitted to access the memory.

In general, in one aspect, the invention relates to a multiprocessor system, comprising a memory, a memory controller operatively connected to the memory, a processor configured to request access to a memory address in the memory to perform a memory operation, a first carrier associated with the memory controller, wherein the first carrier comprises a carrier identification (ID), and a second carrier associated with the processor and configured to determine whether the processor is permitted to access the memory at the memory address using the carrier ID, wherein the first carrier and the second carrier are operatively connected.

Other aspects of the invention will be apparent from the following description and the appended claims.

DETAILED DESCRIPTION

Figure 1:
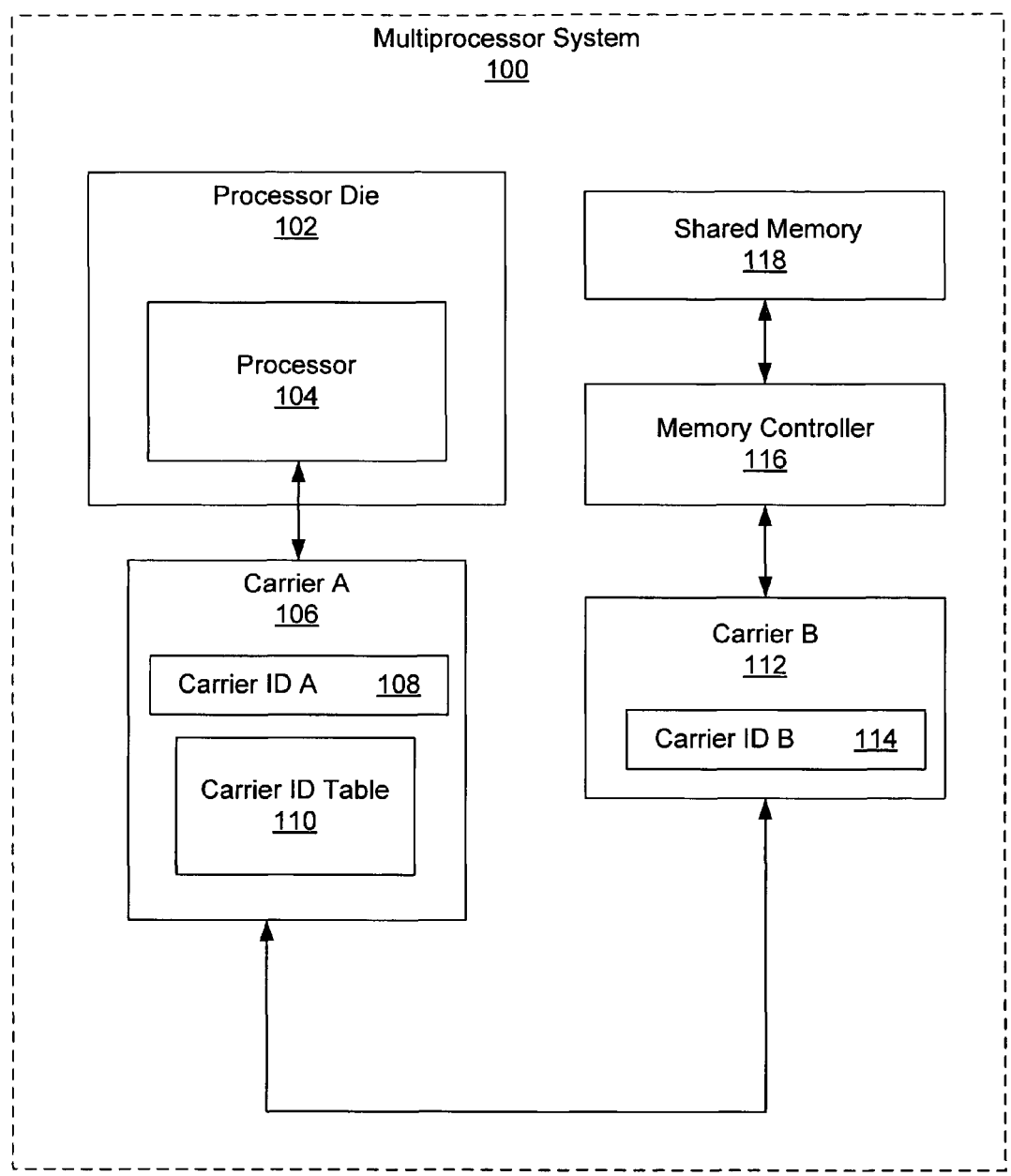
FIG. 1 shows a system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to protecting shared memory from illegal accesses and illegal operations. Specifically, embodiments of the invention provide a method for memory protection that is independent from the processor. More specifically, embodiments of the invention relate to protecting shared memory by offloading memory protection to a communication carrier chip associated with the processor.

FIG. 1 shows a multiprocessor system (100) in accordance with one embodiment of the invention. The multiprocessor system (100) of FIG. 1 shows a processor die (102) operatively connected to a carrier (i.e., Carrier A (106)), which is operatively connected to another carrier (i.e., Carrier B (112)). Carrier B (112) is operatively connected to memory controller (116). The memory controller (116) in turn is operatively connected to a region of shared memory (118). The processor die (102) includes a processor (104), and the processor die (102) is operatively connected to a carrier (i.e., Carrier A (106)) that is associated with the processor (104). Those skilled in the art will appreciate that the processor die (102) may include multiple processors (i.e., processor cores). Further, Carrier A (106) includes a carrier ID (108) and a Carrier ID Table (110). The aforementioned elements of in FIG. 1 are discussed in detail below.

In one embodiment of the invention, the multiprocessor system (100) is configured to offload memory protection from the processor (104) to the carrier associated with the processor (104) (i.e., Carrier A (106)). Thus, the multiprocessor system (100) of FIG. 1 provides memory protection from illegal memory accesses, illegal operations, etc., that is independent from the processor (104). Said another way, because space is limited on the physical area of the processor (104), offloading memory protection to a component outside the processor (104) (e.g., such as a carrier) provides inherent scalability for large, distributed multiprocessor systems.

The processor (104) is configured to request access to a particular memory address in shared memory (118). Specifically, to perform a memory operation (e.g., read, write, execute, etc.), the processor (104) requests access to a particular memory location represented by a memory address. In one embodiment of the invention, the processor is configured to request access to memory locations within shared memory (118). Shared memory (118) is a region of memory that is shared by all or some of the processors in the multiprocessor system (100). That is, processes (or threads) executing on one or more processors can directly access shared memory (118) to store and retrieve data during execution.

As noted above, a memory controller (116) is operatively connected to shared memory (118). The memory controller is an interface between the shared memory (118) and the processor (104). Further, the memory controller (116) is configured to handle the input/output of data going into and coming out of shared memory (118).

Continuing with FIG. 1, Carrier A (106) is configured to receive memory access requests from the processor (104). In one embodiment of the invention, a carrier (106, 112) corresponds to an electrical module configured to communicate with other carriers. Further, carriers (106, 112) are configured to receive data from non-carrier components (i.e., processors, memory controllers, etc.) and forward the data to another carrier. In addition, carriers (106, 112) are configured to receive data from other carriers and forward the received data to the appropriate non-carrier components that are operatively connected to a carrier. Thus, the carriers act as a communication medium between non-carrier components within the multiprocessor system. In one embodiment of the invention, the carrier also includes functionality to perform memory access control (discussed below).

Further, in one embodiment of the invention, each carrier is associated with a carrier identification (ID) (i.e., Carrier A (106) is associated with Carrier ID A (108), Carrier B (112) is associated with Carrier ID B (114)). In addition to identifying the carrier, the carrier ID may also be used to route a processor's memory access request to the appropriate memory controller associated with the memory that the processor is attempting to access. In one embodiment of the invention, when the processor requests access to a memory address in shared memory (118), the request includes the carrier ID, the memory address, and the memory operation that the processor wishes to perform on the memory at the specified memory address. In one embodiment of the invention, the carrier ID is some portion of the memory address requested by the processor. For example, in the system of FIG. 1, the processor (104) may request access to a particular memory address in shared memory (118). In this case, carrier ID B (114) associated with memory controller (116) is specified as a portion of the memory address requested by the processor. In one embodiment of the invention, carrier ID B (114) may be the first 20 bits of the memory address requested by the processor. Those skilled in the art will appreciate that any portion of the memory address or a functional representation of the memory address requested by the processor may form the carrier ID for the appropriate memory controller (e.g., the last 10 bits, rotating the memory address X bit to obtain the carrier ID, etc.).

Continuing with the discussion of FIG. 1, in one embodiment of the invention, a carrier ID table (110) located in Carrier A (106) is used to determine whether the carrier ID obtained from the memory address requested by the processor is valid. In one embodiment of the invention, the carrier ID table (110) may include the carrier IDs for the memory controllers corresponding to memory regions that the processor is permitted to access. In other words, because each processor in the multiprocessor system is allocated specific regions of shared memory, the carrier ID table (110) associated with a particular processor ensures that the processor accesses only memory addresses allocated to the processor. Additionally, in one embodiment of the invention, the carrier ID table (110) includes information about memory operations (i.e., access permissions such as read, write, execute, etc.) permitted for each valid carrier ID. Specifically, each carrier ID stored in the carrier ID table (110) is mapped to a set of memory operations permitted by the processor.

Thus, in one embodiment of the invention, Carrier A (106) includes functionality to check whether the memory address requested by the processor is valid and whether the requested memory operation is permitted by the processor for the shared memory (118) using the carrier ID table (110). Those skilled in the art will appreciate that the carrier ID table (110) may be any mapping mechanism that enables the carrier (106, 112) to determine whether or not a memory address request made by a processor is valid, such as a functional look-up structure, etc. For example, the processor may output the process ID of the process that requests access to a memory address. Subsequently, the process ID (or some portion of the process ID) may be manipulated by the carrier (e.g., right shift the process ID X bits, etc.) to obtain a carrier ID that determines whether or not the process is permitted to access the requested memory address. Those skilled in the art will further appreciate that the type of mapping mechanism implemented by the carrier may depend on the multiprocessor system architecture.

Those skilled in the art will appreciate that although the carrier ID table (110) is shown as residing within Carrier A (106), the invention may be implemented such that the carrier ID table (110) resides in Carrier B (112) (i.e., the carrier associated with the memory address requested by the processor). In this case, the carrier ID table (110) may include a list of valid carrier IDs associated with processors from which the memory controller can accept memory access requests. For example, in one embodiment of the invention, upon receiving a memory address request from the processor, Carrier A (106) may communicate the memory address information to Carrier B (112), and Carrier B (112) may subsequently perform memory protection functions using the carrier ID table (110) or some other form of mapping mechanism to determine whether the processor's memory address request is valid and whether the memory operation requested is permitted. Alternatively, the carrier ID table (110) may reside anywhere in the multiprocessor system (e.g., in a shared cache, etc.), where each carrier includes functionality to locate and access the carrier ID table. Further, in one embodiment of the invention, several carrier ID tables associated with carriers of multiple processors may be stored in one location in the multiprocessor system (100).

As noted above, each carrier (106, 112) includes functionality to communicate with other carriers in the system. In one embodiment of the invention, carriers (106, 112) communicate with other carriers using a communication channel. In one embodiment of the invention, the communication channel may be an electrical bus that connects all the carriers. Alternatively, in one embodiment of the invention, carriers (106, 112) may communicate using proximity communication, in which case the carriers would not be connected using any wires. Proximity communication involves communication over short distances between integrated circuits that are arranged such that transmitting and receiving circuits in the integrated circuits are aligned with only microns of distance between them. Accordingly, capacitive coupling causes a voltage change on a transmitting circuit to induce a voltage change on a corresponding receiving circuit of the facing integrated circuit. This makes it possible to transmit signals directly between the integrated circuits without having to route the signal through intervening signal lines. Proximity communication may also be implemented using inductive coupling and/or electromagnetic coupling. Thus, carriers (106, 112) may be positioned such that a transmitting circuit and a receiving circuit are very close to each other, enabling communication between carriers using proximity communication.

Those skilled in the art will appreciate that the processor's memory address request in shared memory (118) may be communicated from Carrier A (106) to several other carriers associated with various system components before being received by Carrier B (112). For example, the processor's memory address request may be communicated from Carrier A (106) to a carrier associated with another processor, a carrier associated with a memory controller other than memory controller (116), etc. Eventually, however, the processor's memory address request is communicated to Carrier B (112).

Further, in one embodiment of the invention, carriers associated with processors (e.g., Carrier A (106)) requesting access to shared memory (118) may include functionality to directly access shared memory or communicate directly with the memory controller associated with the shared memory (e.g., memory controller (116) associated with shared memory (118)) to determine whether a processor's memory access request is valid (i.e., without associating the requested memory address with another carrier). In this case, the carrier associated with the processor (e.g., Carrier A (106)) may store information regarding which memory addresses correspond to valid memory that the processor is permitted to access and simply permit valid access request and filter out invalid access requests. In this manner, the processor's memory access request is performed directly without involving carriers of other system components (i.e., memory controllers, caches, etc.), with the memory protection functionality still being performed independently from the processor (i.e., offloaded onto the processor's carrier).

Although only one processor and one memory controller are shown in FIG. 1, those skilled in the art will appreciate that the multiprocessor system (100) may include multiple processors, carriers, shared memory regions, memory controllers, etc. For example, in one embodiment of the invention, the multiprocessor system (100) may include a shared memory pool composed of a large number of discrete memory blocks, each of which has its own memory controller. In addition, the multiprocessor system (100) may include other components not shown in FIG. 1.

Figure 2:
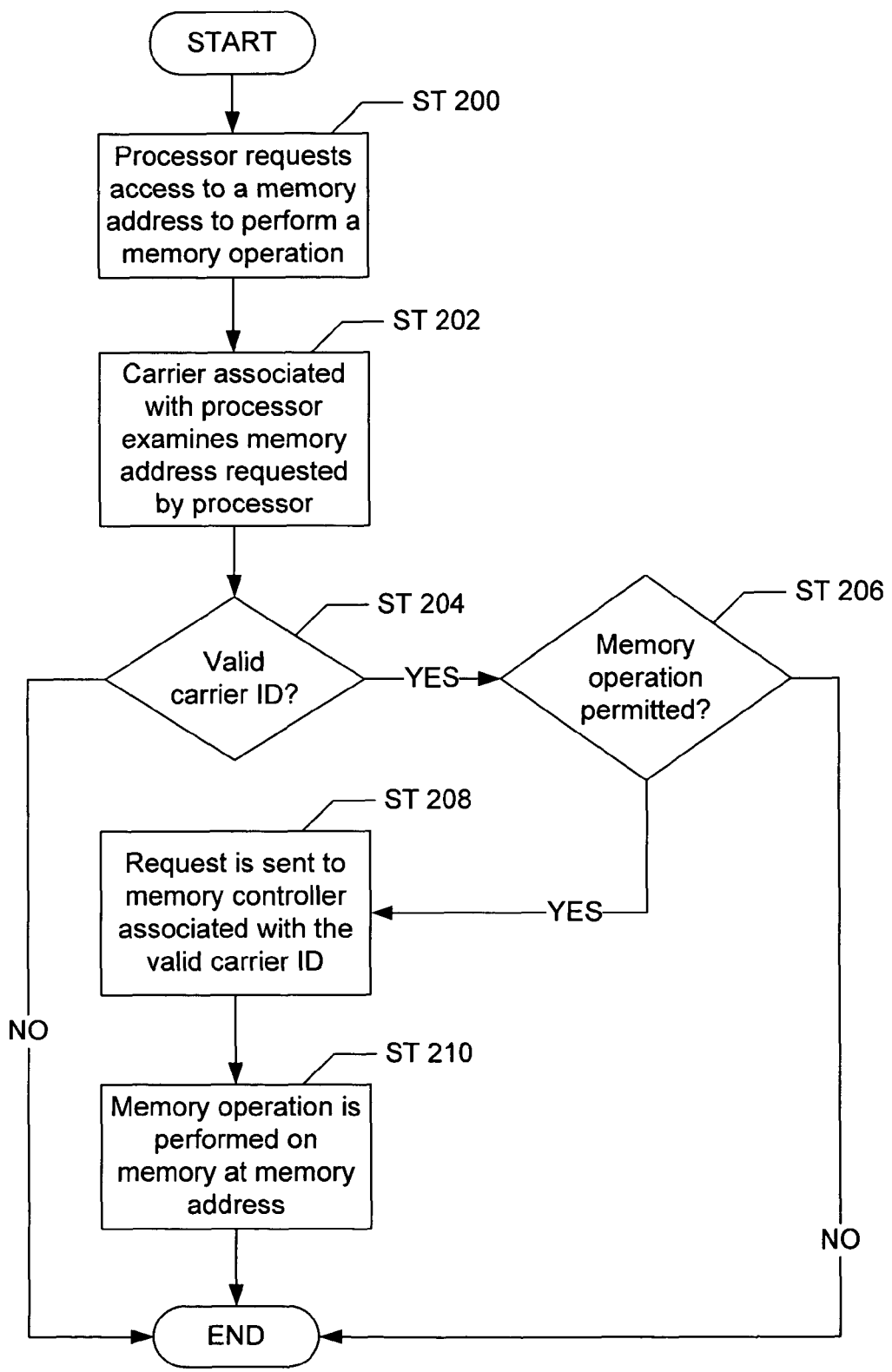
FIG. 2 shows a flow chart in accordance with one embodiment of the invention.

FIG. 2 shows a flow chart for enforcing memory access using a carrier in accordance with one embodiment of the invention. Initially, a processor requests access to a memory address to perform a memory operation (Step 200). Subsequently, the carrier associated with the processor examines the memory address (Step 202). Specifically, in one embodiment of the invention, a portion of the memory address corresponding to a carrier ID is obtained by the carrier and compared to a list of valid carrier IDs stored in the carrier. As described above, the list of valid carrier IDs may be stored in a carrier ID table in the carrier, or any other look-up structure that enables the carrier to determine whether the carrier ID is valid. If a match is found (i.e., if the carrier ID corresponding to the requested memory address is valid (Step 204)), then a subsequent determination is made as to whether the memory operation is permitted (Step 206). Alternatively, if a match is not found, or if the memory operation requested by the processor is not permitted, then the process ends because the processor may be attempting to access an illegal memory address or a memory address located in a region of shared memory that is not allocated for the processor's use.

If the carrier ID is valid and the memory operation requested by the processor is permitted, then the request for access to the memory address is sent to the carrier specified by the valid carrier ID (Step 208). The carrier associated with the valid carrier ID is associated with a memory controller that provides access to the memory specified by the memory address requested by the processor. In one embodiment of the invention, the request for access to the memory address may be communicated via the carrier associated with the processor to other carriers associated with various system components before being received by the carrier specified by the valid carrier ID. As described above, carriers may communicate the processor's request using an electrical bus or proximity communication.

Continuing with FIG. 2, once the request is sent to the appropriate carrier associated with a memory controller corresponding to the memory address requested by the processor, the memory operation is performed on the memory at the memory address (Step 210) and the process ends. Those skilled in the art will appreciate that if a memory failure occurs while performing a memory operation, then the processor is made aware of the memory failure using methods well-known in the art. The process shown in FIG. 2 may be repeated for each memory access request by any processor within the multiprocessor system.

As described above, memory protection functions may be performed by a carrier associated with the memory controller of the region of shared memory that a processor requests access to. For example, a carrier associated with a memory controller may include or have access to a carrier ID table that provides the carrier IDs of the processors permitted to access the particular shared memory region associated with the memory controller. In this case, the carrier associated with the memory controller may examine the memory address requested by a processor (Step 202 of FIG. 2). Further, Step 204 of FIG. 2 may involve determining whether the carrier ID of the carrier associated with the processor is valid. Subsequently, if the memory operation requested by the processor is permitted, then the memory operation may be performed on shared memory at the requested memory address.

Using the method shown in FIG. 2, the carrier associated with the processor is able to provide memory protection of shared memory in a multiprocessor system by checking both the validity of the memory address requested by the processor and the access permission associated with the memory operation requested by the processor. Those skilled in the art will appreciate that in some cases, the carrier may check only whether the carrier ID corresponding to the memory address requested by the process is valid, and may not perform the access permission check to ensure that the memory operation requested by the processor is permitted. For example, if the processor is predetermined to have all access permissions, etc., then the Step 206 in FIG. 2 may not be performed.

Figure 3:
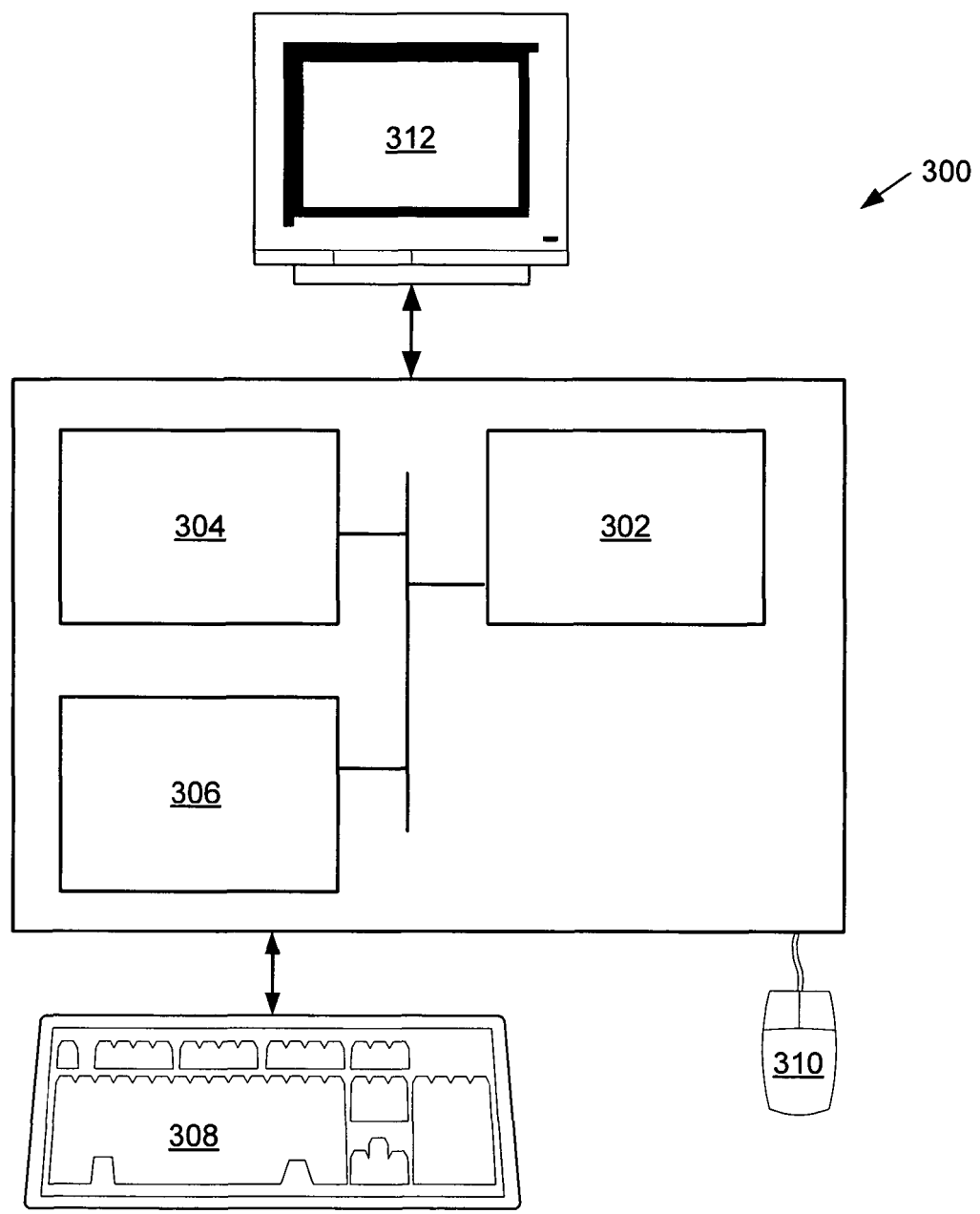
FIG. 3 shows a computer system in accordance with one embodiment of the invention.

One or more embodiments of the invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network via a network interface connection (not shown). Those skilled in the art will appreciate that these input and output means may take other forms. Further, those skilled in the art will appreciate that one or more elements of the aforementioned computer (300) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method and system for offloading memory protection of a multiprocessor system to a processor carrier chip, allowing memory protection functions to be performed independently from the processor. Because each processor is associated with a carrier, individual memory protection for each processor can be performed by the associated carrier. Further, because the size of the processor is fixed and the number of elements outside of the processor is not fixed, offloading memory protection to the processor carrier chip allows for flexibility in memory protection mechanisms and algorithms for large scalable systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for memory protection in a multiprocessor system, comprising:
    receiving, by a first processor carrier directly from a first processor of a plurality of processors of the multiprocessor system, a first request to perform a first memory operation at a first memory address in a first specific region of a random access memory,
        wherein the first processor carrier is associated with the first processor and the random access memory is shared memory of the plurality of processors in the multiprocessor system, and
        wherein the first processor is located on a first processor die and the first processor carrier is directly connected to the first processor;
    determining by the first processor carrier whether the first processor is permitted to access the random access memory at the first memory address using a first carrier identification (ID) of a first memory carrier, wherein the first memory carrier is associated with a first memory controller used to access the first specific region of the random access memory;
    receiving, by a second processor carrier directly from a second processor of the plurality of processors, a second request at a second processor carrier to perform a second memory operation at a second memory address in a second specific region of the random access memory,
        wherein the second processor carrier is associated with the second processor, and
        wherein the second processor is located on a second processor die and the second processor carrier is directly connected to the second processor;
    determining, by the second processor carrier, whether the second processor is permitted to access the random access memory at the second memory address using a second carrier ID of a second memory carrier, wherein the second memory carrier is associated with a second memory controller used to access the second specific region of the random access memory;
    sending the first request to the first memory carrier when the first processor is permitted to access the first specific region of the random access memory at the first memory address; and
    sending the second request to the second memory carrier when the second processor is permitted to access the second specific region of the random access memory at the second memory address,
        wherein the first processor carrier is operatively connected to each of the first memory carrier, the second processor carrier, and the second memory carrier, and
        wherein the first memory carrier is operatively connected to each of the second processor carrier and the second memory carrier.

2. The method of claim 1, further comprising:
    determining whether the first processor is permitted to perform the first memory operation using the first carrier ID.

3. The method of claim 1, wherein determining whether the first processor is permitted to access the first specific region of the random access memory comprises using a carrier ID table.

4. The method of claim 3, wherein the first processor carrier comprises the carrier ID table.

5. The method of claim 3, wherein the carrier ID table comprises a list of valid carrier IDs corresponding to memory controllers that the first processor is permitted to access and memory operations permitted for each valid carrier ID.

6. The method of claim 1, wherein the first memory address comprises the carrier ID.

7. The method of claim 6, wherein the first carrier ID is used to route the first request to the first memory controller.

8. The method of claim 1, wherein the first processor carrier is configured to provide connectivity of the first processor to the first memory carrier.

9. The method of claim 8, wherein the first processor carrier communicates with the first memory carrier via a communication channel.

10. The method of claim 9, wherein the communication channel is one selected from the group consisting of electrical wires and proximity communication.

11. A multiprocessor system, comprising:
a random access memory;
a first memory controller operatively connected to the random access memory and used to access a first specific region of the random access memory;
a second memory controller operatively connected to the random access memory and used to access a second specific region of the random access memory;
a first processor configured to request access to a first memory address in the first specific region of the random access memory to perform a first memory operation, wherein the first processor is one of a plurality of processors,
wherein the first processor is located on a first processor die, and
wherein the random access memory is shared memory of the plurality of processors in the multiprocessor system;
a second processor configured to request access to a second memory address in the second specific region of the random access memory to perform a second memory operation, wherein the second processor is one of the plurality of processors, and wherein the second processor is located on a second processor die;
a first memory carrier associated with the first memory controller, wherein the first memory carrier comprises a first carrier identification (ID);
a first processor carrier associated with the first processor and configured to:
receive a first request to access the first memory address directly from the first processor, and
determine whether the first processor is permitted to access the first specific region of the random access memory at the first memory address using the first carrier ID, wherein the first processor carrier is directly connected to the first processor; and
a second processor carrier associated with the second processor and configured to:
receive a second request to access the second memory address directly from the second processor, and
determine whether the second processor is permitted to access the second specific region of the random access memory at the second memory address using a second carrier ID, wherein the second processor carrier is directly connected to the second processor,
a second memory carrier associated with the second memory controller, wherein the second memory carrier comprises the second carrier ID;
wherein the first memory carrier is operatively connected to each of the first processor carrier, the second processor carrier, and the second memory carrier, and
wherein the first processor carrier is operatively connected to each of the second processor carrier and the second memory carrier.

12. The system of claim 11, wherein the first memory carrier communicates to the first processor carrier using a communication channel.

13. The system of claim 12, wherein the communication channel is one selected from the group consisting of electrical wires and proximity communication.

14. The system of claim 11, wherein the first processor carrier is further configured to determine whether the first memory operation is permitted by the first processor using the first carrier ID.

15. The system of claim 11, wherein the first memory address comprises the first carrier ID.

16. The system of claim 11, wherein the first carrier ID is used to route the request to access the first memory address to an appropriate memory controller.

17. The system of claim 11, wherein determining whether the first processor is permitted to access the first specific region of the random access memory comprises using a carrier ID table.

18. The system of claim 17, wherein the first memory carrier comprises the carrier ID table.

19. The system of claim 17, wherein the carrier ID table comprises a list of valid carrier IDs corresponding to memory controllers that the first processor is permitted to access and memory operations permitted for each valid carrier ID.

* * * * *